(12) United States Patent
Chen

(10) Patent No.: US 6,964,380 B1
(45) Date of Patent: Nov. 15, 2005

(54) SPRAYING GUN HAVING FLOW RATE CONTROL EFFECT

(75) Inventor: Chin-Yuan Chen, Changhua Hsien (TW)

(73) Assignee: Shin Tai Spurt Water of the Garden Tools Co., Ltd., Changhua Hsien (TW)

( * ) Notice: Subject to any disclaimer, the term of this patent is extended or adjusted under 35 U.S.C. 154(b) by 0 days.

(21) Appl. No.: 10/914,318

(22) Filed: Aug. 9, 2004

(51) Int. Cl.[7] .................................................. B05B 7/26
(52) U.S. Cl. ..................... 239/315; 239/310; 239/317; 239/318; 239/375; 239/413; 239/416.5; 239/417; 239/417.5; 239/530; 239/532; 239/581.1; 137/876; 137/893; 137/894; 222/144.5
(58) Field of Search ................................ 239/310, 315, 239/317, 318, 375, 407, 409, 413, 416.5, 239/417, 417.3, 417.5, 525, 530, 532, 581.1; 137/876, 888, 893, 894; 222/144.5, 145.1, 222/145.5

(56) References Cited

U.S. PATENT DOCUMENTS

| 2,797,132 | A | * | 6/1957 | Alpert | 239/315 |
| 2,908,445 | A | * | 10/1959 | Schwartz | 239/317 |
| 5,944,258 | A | * | 8/1999 | Chih | 239/318 |
| 6,164,496 | A | * | 12/2000 | Gregory | 222/144.5 |
| 6,371,386 | B1 | * | 4/2002 | Hoy | 239/316 |
| 6,572,032 | B2 | * | 6/2003 | Chih | 239/375 |

* cited by examiner

Primary Examiner—Steven J. Ganey
(74) Attorney, Agent, or Firm—Alan D. Kamrath; Nikolai & Mersereau, P.A.

(57) ABSTRACT

A spraying gun includes a water inlet connector, a connecting member, an adjusting member, a detergent tube, a water conducting tube, and an extension pipe. Thus, the water flow rate of the spraying gun is adjusted by rotation of the adjusting member, thereby facilitating a user regulating the water flow rate of the spraying gun. In addition, the water is mixed with the detergent by rotation of the adjusting member to provide a cleaning effect.

16 Claims, 5 Drawing Sheets

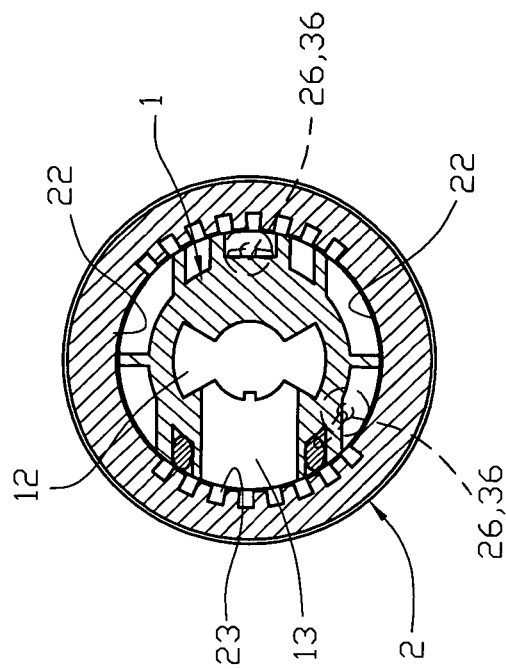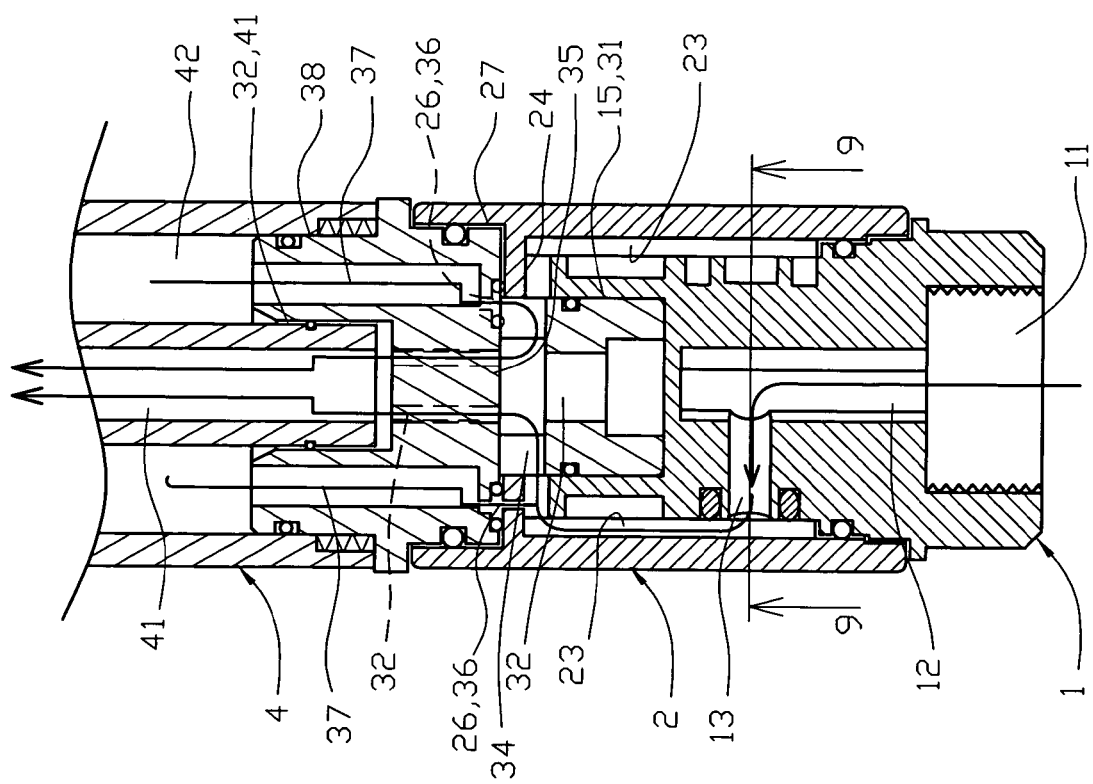

SPRAYING GUN HAVING FLOW RATE CONTROL EFFECT

BACKGROUND OF THE INVENTION

1. Field of the Invention

The present invention relates to a spraying gun, and more particularly to a spraying gun having a flow rate control effect.

2. Description of the Related Art

A conventional spraying gun comprises a water inlet connector connected to a water source, a water conducting tube having a first end mounted on the water inlet connector, and an extension pipe having a first end mounted on a second end of the water conducting tube by a locking member and a second end provided with an adapter for mounting a brush. Thus, the water from the water source in turn flows through the water inlet connector and the water conducting tube and is sprayed outward from the extension pipe for use. However, the water flow rate of the conventional spraying gun cannot be regulated and controlled to satisfy the user's requirement, so that the water output easily exceeds the practical requirement, thereby greatly causing a water consumption.

SUMMARY OF THE INVENTION

In accordance with the present invention, there is provided a spraying gun, comprising a water inlet connector, a connecting member, an adjusting member, wherein:

the water inlet connector has an inside formed with a water inlet chamber and a peripheral wall formed with a water outlet hole communicating with the water inlet chamber;

the connecting member is secured on the water inlet connector and has an inside formed with a water passage and a peripheral wall formed with a water inlet hole communicating with the water passage, the inside of the connecting member is formed with a plurality of detergent channels, the connecting member has an end face formed with a plurality of detergent passages communicating with the detergent channels; and the adjusting member is rotatably mounted on the water inlet connector and the connecting member and has an inside formed with a stop edge that is movable to align with and seal the water outlet hole of the water inlet connector and a plurality of elongated recessed water connecting portions that are movable to align with the water outlet hole of the water inlet connector and the water inlet hole of the connecting member, the inside of the adjusting member is formed with a catch portion rested on the end face of the connecting member, the catch portion of the adjusting member is formed with plurality of detergent holes which communicate with the water connecting portions and are movable to align with the detergent passages of the connecting member.

The primary objective of the present invention is to provide a spraying gun having a flow rate control effect.

Another objective of the present invention is to provide a spraying gun, wherein the water flow rate of the spraying gun is adjusted by rotation of the adjusting member, thereby facilitating a user regulating the water flow rate of the spraying gun.

A further objective of the present invention is to provide a spraying gun, wherein the adjusting member is operated easily and conveniently, thereby facilitating the user controlling the water flow rate of the spraying gun.

A further objective of the present invention is to provide a spraying gun, wherein the water is mixed with the detergent by rotation of the adjusting member to provide a cleaning effect.

Further benefits and advantages of the present invention will become apparent after a careful reading of the detailed description with appropriate reference to the accompanying drawings.

BRIEF DESCRIPTION OF THE DRAWINGS

FIG. 8 is a schematic operational view of the spraying gun as shown in FIG. 6; and FIG. 9 is a cross-sectional view of the spraying gun taken along line 9—9 as shown in FIG. 8.

DETAILED DESCRIPTION OF THE INVENTION

Figure 1:
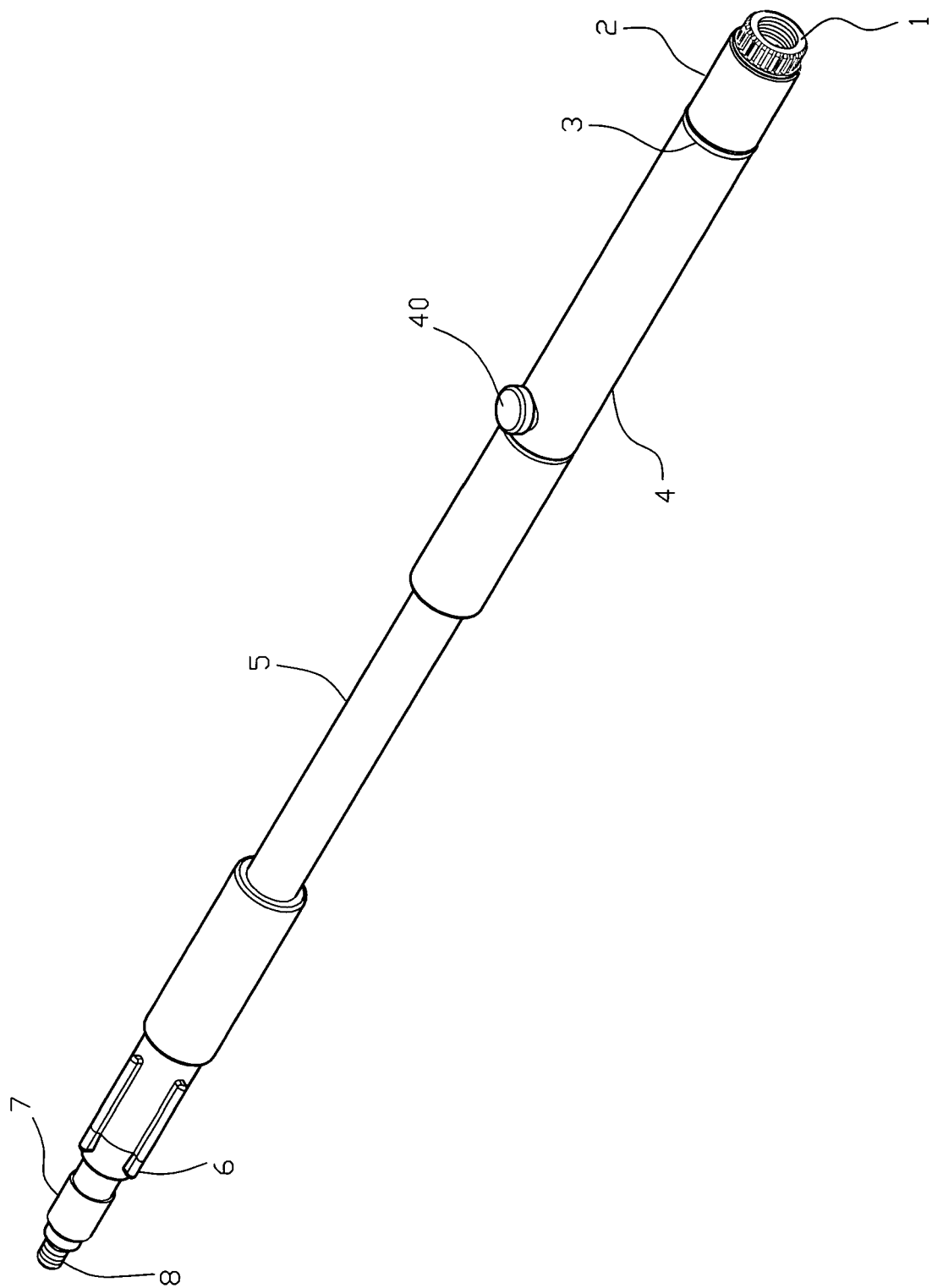
FIG. 1 is a perspective view of a spraying gun in accordance with the preferred embodiment of the present invention.

Referring to the drawings and initially to FIGS. 1–5, a spraying gun in accordance with the preferred embodiment of the present invention comprises a water inlet connector 1, a connecting member 3, an adjusting member 2, a detergent tube 4, a water conducting tube 5, and an extension pipe 7.

The water inlet connector 1 is connected to a water source (not shown). The water inlet connector 1 has an inside formed with a water inlet chamber 12 connected to the water source and has a peripheral wall formed with a water outlet hole 13 communicating with the water inlet chamber 12. The water inlet connector 1 has an outside formed with a spring-biased positioning boss 14. The water inlet connector 1 has a first end formed with a mounting recess 15 and a second end formed with a threaded locking recess 11 communicating with the water inlet chamber 12. The mounting recess 15 of the water inlet connector 1 has a periphery formed with an inward extended locking protrusion 16.

The connecting member 3 is secured on the water inlet connector 1 and has an inside formed with a water passage 32 and a peripheral wall formed with a water inlet hole 34 communicating with the water passage 32. The peripheral wall of the connecting member 3 is formed with a water dividing bar 35 (see FIG. 3) located between the water inlet hole 34 and the water passage 32. Preferably, the water dividing bar 35 crosses the water passage 32 and does not stop the water passage 32 completely. The inside of the connecting member 3 is formed with a plurality of equally spaced detergent channels 37 (see FIG. 3), and the connecting member 3 has an end face 39 formed with a plurality of equally spaced detergent passages 36 communicating with the detergent channels 37. The connecting member 3 has a first end formed with a mounting portion 31 inserted into the mounting recess 15 of the water inlet connector 1 and a second end formed with a connecting portion 38. The mounting portion 31 of the connecting member 3 has a periphery formed with a substantially L-shaped locking slot 33, and the locking protrusion 16 of the mounting recess 15 of the water inlet connector 1 is inserted into and locked in the locking slot 33 of the mounting portion 31 of the connecting member 3.

The adjusting member 2 is rotatably mounted on the water inlet connector 1 and the connecting member 3 and has an inside formed with a stop edge 22 and a plurality of elongated recessed water connecting portions 23. The water connecting portions 23 of the adjusting member 2 are extended in an axial direction of the adjusting member 2 and are arranged in an arc-shaped manner. The inside of the adjusting member 2 is formed with an inward extended annular catch portion 24 rested on the end face 39 of the connecting member 3. The catch portion 24 of the adjusting member 2 is formed with plurality of equally spaced detergent holes 26 which communicate with the water connecting portions 23 and are movable to align with the detergent passages 36 of the connecting member 3. The catch portion 24 of the adjusting member 2 has a central portion formed with a through hole 25 to allow passage of the mounting portion 31 of the connecting member 3. The adjusting member 2 has a first end having an inside formed with a plurality of positioning grooves 21, and the positioning boss 14 of the water inlet connector 1 is detachably positioned in either one of the positioning grooves 21 of the adjusting member 2. The adjusting member 2 has a second end having an inside formed with a receiving recess 27 mounted on the connecting member 3.

Figure 5:
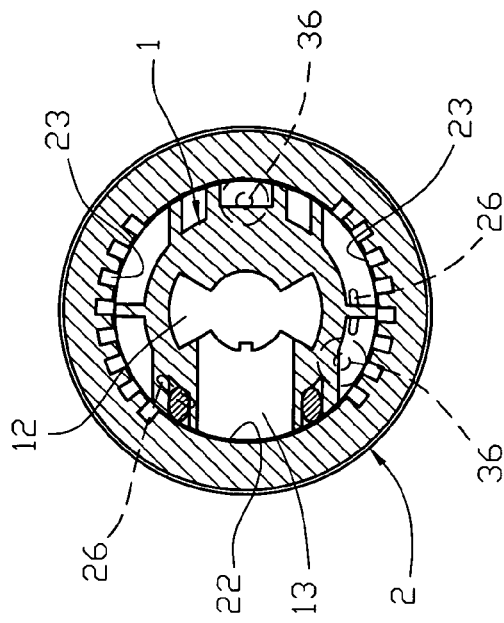
FIG. 5 is a cross-sectional view of the spraying gun taken along line 5—5 as shown in FIG. 4.
Figure 4:
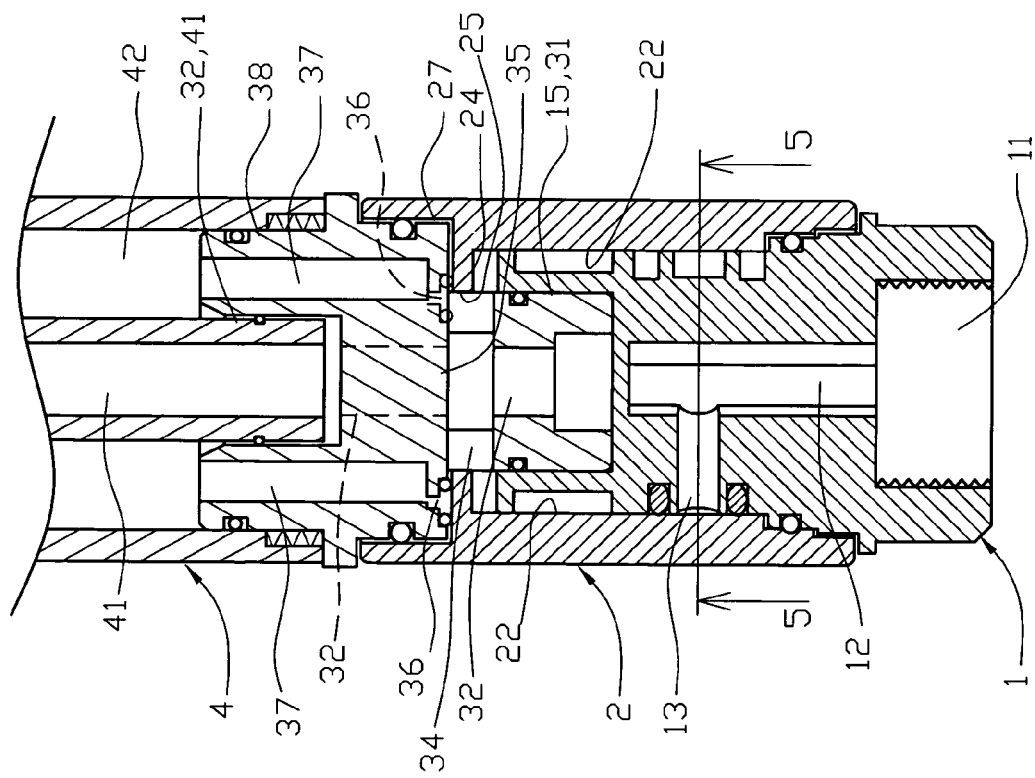
FIG. 4 is a plan cross-sectional assembly view of the spraying gun as shown in FIG. 2.
Figure 7:
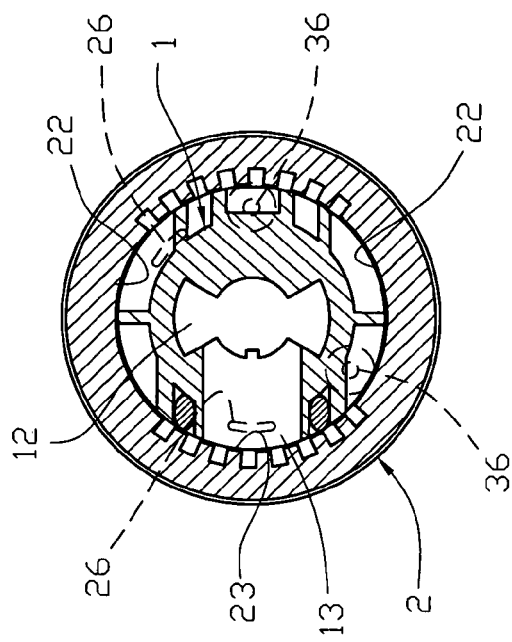
FIG. 7 is a cross-sectional view of the spraying gun taken along line 7—7 as shown in FIG. 6.
Figure 6:
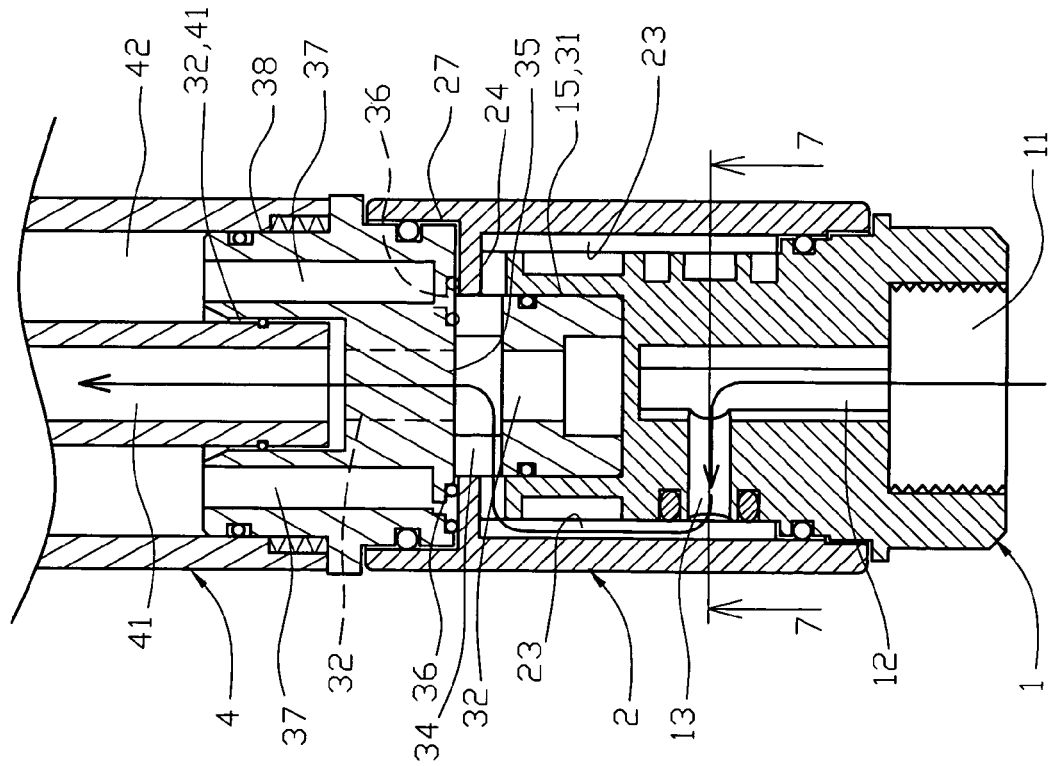
FIG. 6 is a schematic operational view of the spraying gun as shown in FIG. 4.

In practice, the adjusting member 2 is rotatable on the water inlet connector 1 to move between a first position as shown in FIGS. 6 and 7 where the water connecting portions 23 of the adjusting member 2 align with the water outlet hole 13 of the water inlet connector 1 and the water inlet hole 34 of the connecting member 3, so that the water outlet hole 13 of the water inlet connector 1 is connected to the water inlet hole 34 of the connecting member 3, and a second position as shown in FIGS. 4 and 5 where the stop edge 22 of the adjusting member 2 aligns with and seals the water outlet hole 13 of the water inlet connector 1 to interrupt a connection between the water outlet hole 13 of the water inlet connector 1 and the water inlet hole 34 of the connecting member 3.

In addition, the adjusting member 2 is rotatable on the water inlet connector 1 to further move to a third position as shown in FIGS. 8 and 9 where the water connecting portions 23 of the adjusting member 2 align with the water outlet hole 13 of the water inlet connector 1 and the water inlet hole 34 of the connecting member 3, so that the water outlet hole 13 of the water inlet connector 1 is connected to the water inlet hole 34 of the connecting member 3, and the detergent holes 26 of the catch portion 24 of the adjusting member 2 align with the detergent passages 36 of the connecting member 3, so that the water outlet hole 13 of the water inlet connector 1 and the water connecting portions 23 of the adjusting member 2 are connected to the detergent passages 36 of the connecting member 3 through the detergent holes 26 of the catch portion 24 of the adjusting member 2.

The detergent tube 4 is mounted on the connecting member 3 and has an inside formed with a water outlet conduit 41 communicating with the water passage 32 of the connecting member 3 and a peripheral wall formed with a detergent conduit 42 communicating with the detergent channels 37 of the connecting member 3. The peripheral wall of the detergent tube 4 is formed with a filling port 40 (see FIG. 1) for filling detergent into the detergent conduit 42. The detergent tube 4 has a first end mounted on the connecting portion 38 of the connecting member 3.

The water conducting tube 5 has a first end mounted on a second end of the detergent tube 4.

The extension pipe 7 has a first end mounted on a second end of the water conducting tube 5 by a locking member 6 and a second end provided with an adapter 8 for mounting a brush (not shown).

Figures 2, 3:
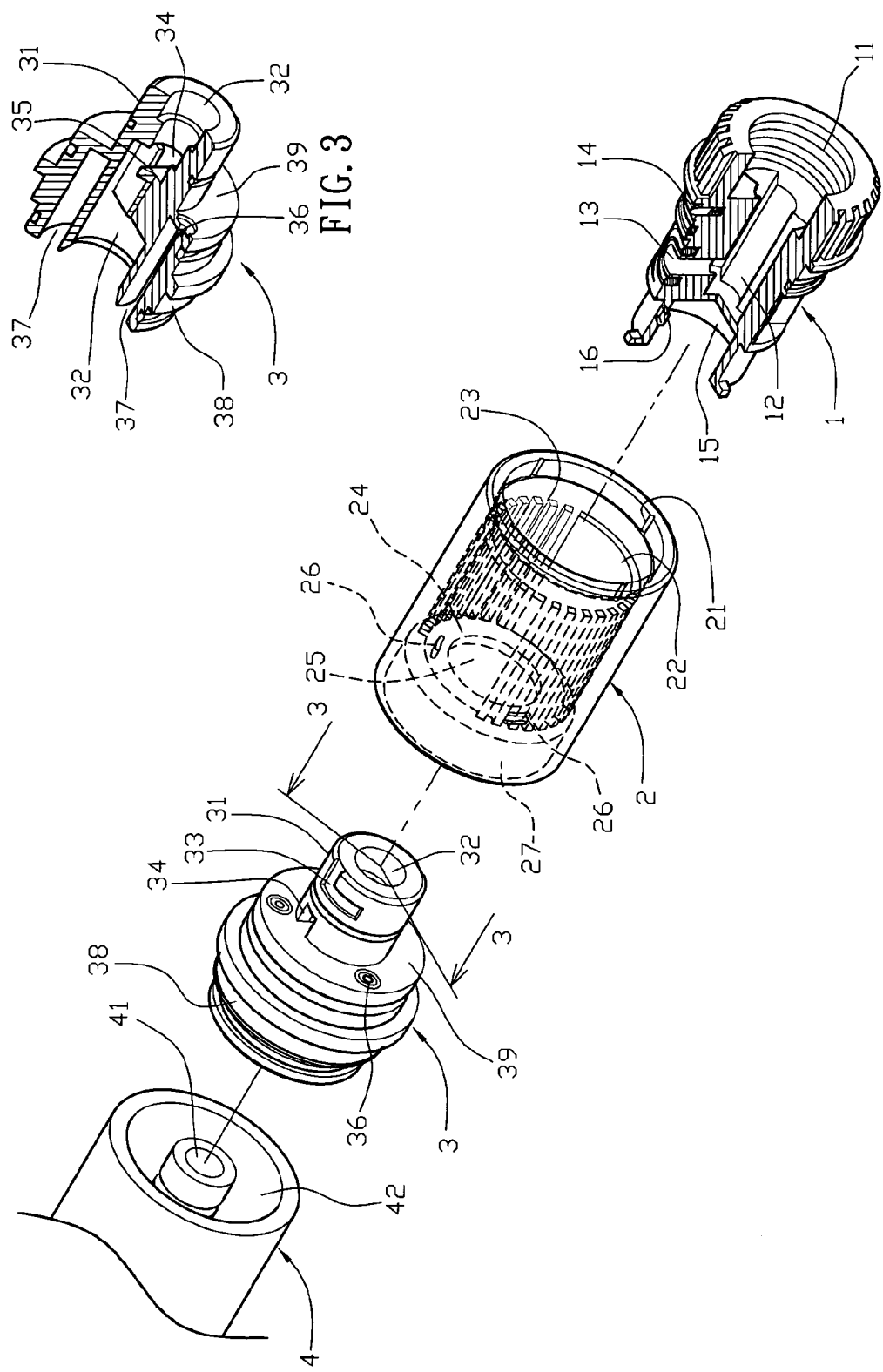
FIG. 2 is a partially exploded perspective view of the spraying gun as shown in FIG. 1.
FIG. 3 is a perspective cross-sectional view of a connecting member of the spraying gun taken along line 3—3 as shown in FIG. 2.

In operation, referring to FIGS. 4–9 with reference to FIGS. 1–3, when the adjusting member 2 is rotated relative to the water inlet connector 1 to move to the position as shown in FIGS. 4 and 5, the stop edge 22 of the adjusting member 2 aligns with and closely seals the water outlet hole 13 of the water inlet connector 1 to interrupt the connection between the water outlet hole 13 of the water inlet connector 1 and the water inlet hole 34 of the connecting member 3, so that the water flow from the water inlet chamber 12 of the water inlet connector 1 is stopped.

Alternatively, when the adjusting member 2 is rotated relative to the water inlet connector 1 to move to the position as shown in FIGS. 6 and 7, the water connecting portions 23 of the adjusting member 2 align with the water outlet hole 13 of the water inlet connector 1 and the water inlet hole 34 of the connecting member 3, so that the water outlet hole 13 of the water inlet connector 1 is connected to the water inlet hole 34 of the connecting member 3. In such a manner, the water flow from the water inlet chamber 12 of the water inlet connector 1 in turn flows through the water outlet hole 13 of the water inlet connector 1, the water connecting portions 23 of the adjusting member 2, the water inlet hole 34 of the connecting member 3 and the water passage 32 of the connecting member 3 into the water outlet conduit 41 of the detergent tube 4, then flows through the water conducting tube 5 and is finally sprayed outward from the extension pipe 7 for use.

As shown in FIG. 7, the water outlet hole 13 of the water inlet connector 1 completely aligns with the water connecting portions 23 of the adjusting member 2, so that the flow rate has the maximum value. On the other hand, when the water outlet hole 13 of the water inlet connector 1 has a first portion aligning with the water connecting portions 23 of the adjusting member 2 and a second portion sealed by the stop edge 22 of the adjusting member 2, the flow rate is reduced and adjusted.

Alternatively, when the adjusting member 2 is rotated relative to the water inlet connector 1 to move to the position as shown in FIGS. 8 and 9, the water connecting portions 23 of the adjusting member 2 align with the water outlet hole 13 of the water inlet connector 1 and the water inlet hole 34 of the connecting member 3, so that the water outlet hole 13 of the water inlet connector 1 is connected to the water inlet hole 34 of the connecting member 3.

At the same time, the detergent holes 26 of the adjusting member 2 align with the detergent passages 36 of the connecting member 3, so that the water outlet hole 13 of the water inlet connector 1 and the water connecting portions 23 of the adjusting member 2 are connected to the detergent passages 36 of the connecting member 3 through the detergent holes 26 of the catch portion 24 of the adjusting member 2.

In such a manner, the detergent contained in the detergent tube 4 in turn flows through the detergent conduit 42, the detergent channels 37 of the connecting member 3, the detergent passages 36 of the connecting member 3 and the detergent holes 26 of the adjusting member 2 into the inside of the adjusting member 2 to mix with the water passing through the water connecting portions 23 of the adjusting member 2, so that the water is mixed with the detergent to provide a cleaning effect.

Accordingly, the water flow rate of the spraying gun is adjusted by rotation of the adjusting member 2, thereby facilitating a user regulating the water flow rate of the spraying gun. In addition, the adjusting member 2 is operated easily and conveniently, thereby facilitating the user controlling the water flow rate of the spraying gun. Further, the water is mixed with the detergent by rotation of the adjusting member 2 to provide a cleaning effect.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A spraying gun, comprising a water inlet connector, a connecting member, an adjusting member, wherein:
   the water inlet connector has an inside formed with a water inlet chamber and a peripheral wall formed with a water outlet hole communicating with the water inlet chamber;
   the connecting member is secured on the water inlet connector and has an inside formed with a water passage and a peripheral wall formed with a water inlet hole communicating with the water passage, the inside of the connecting member is formed with a plurality of detergent channels, the connecting member has an end face formed with a plurality of detergent passages communicating with the detergent channels; and
   the adjusting member is rotatably mounted on the water inlet connector and the connecting member and has an inside formed with a stop edge that is movable to align with and seal the water outlet hole of the water inlet connector and a plurality of elongated recessed water connecting portions that are movable to align with the water outlet hole of the water inlet connector and the water inlet hole of the connecting member, the inside of the adjusting member is formed with a catch portion rested on the end face of the connecting member, the catch portion of the adjusting member is formed with a plurality of detergent holes which communicate with the water connecting portions and are movable to align with the detergent passages of the connecting member.

2. The spraying gun in accordance with claim 1, wherein the adjusting member is rotatable on the water inlet connector to move between a first position where the water connecting portions of the adjusting member align with the water outlet hole of the water inlet connector and the water inlet hole of the connecting member, so that the water outlet hole of the water inlet connector is connected to the water inlet hole of the connecting member, and a second position where the stop edge of the adjusting member aligns with and seals the water outlet hole of the water inlet connector to interrupt a connection between the water outlet hole of the water inlet connector and the water inlet hole of the connecting member.

3. The spraying gun in accordance with claim 2, wherein the adjusting member is rotatable on the water inlet connector to further move to a third position where the water connecting portions of the adjusting member align with the water outlet hole of the water inlet connector and the water inlet hole of the connecting member, so that the water outlet hole of the water inlet connector is connected to the water inlet hole of the connecting member, and the detergent holes of the catch portion of the adjusting member align with the detergent passages of the connecting member, so that the water outlet hole of the water inlet connector and the water connecting portions of the adjusting member are connected to the detergent passages of the connecting member through the detergent holes of the catch portion of the adjusting member.

4. The spraying gun in accordance with claim 1, wherein the adjusting member has an end having an inside formed with a plurality of positioning grooves, and the water inlet connector has an outside formed with a spring-biased positioning boss detachably positioned in either one of the positioning grooves of the adjusting member.

5. The spraying gun in accordance with claim 1, wherein the water inlet connector has an end formed with a mounting recess, and the connecting member has an end formed with a mounting portion inserted into the mounting recess of the water inlet connector.

6. The spraying gun in accordance with claim 5, wherein the mounting portion of the connecting member has a periphery formed with a locking slot, and the mounting recess of the water inlet connector has a periphery formed with an inward extended locking protrusion inserted into and locked in the locking slot of the mounting portion of the connecting member.

7. The spraying gun in accordance with claim 6, wherein the locking slot of the mounting portion of the connecting member is substantially L-shaped.

8. The spraying gun in accordance with claim 5, wherein the catch portion of the adjusting member has a central portion formed with a through hole to allow passage of the mounting portion of the connecting member.

9. The spraying gun in accordance with claim 1, wherein the water inlet connector has an end formed with a locking recess communicating with the water inlet chamber.

10. The spraying gun in accordance with claim 1, further comprising detergent tube mounted on the connecting member and having an inside formed with a water outlet conduit communicating with the water passage of the connecting member and a peripheral wall formed with a detergent conduit communicating with the detergent channels of the connecting member.

11. The spraying gun in accordance with claim 10, wherein the connecting member has an end formed with a connecting portion, and the detergent tube has an end mounted on the connecting portion of the connecting member.

12. The spraying gun in accordance with claim 1, wherein the water connecting portions of the adjusting member are extended in an axial direction of the adjusting member.

13. The spraying gun in accordance with claim 1, wherein the water connecting portions of the adjusting member are arranged in an arc-shaped manner.

14. The spraying gun in accordance with claim 1, wherein the adjusting member has an end having an inside formed with a receiving recess mounted on the connecting member.

15. The spraying gun in accordance with claim 1, wherein the peripheral wall of the connecting member is formed with a water dividing bar located between the water inlet hole and the water passage.

16. The spraying gun in accordance with claim 15, wherein the water dividing bar crosses the water passage and does not stop the water passage completely.

* * * * *